A. S. HOLMES.
HORSESHOE.
APPLICATION FILED JUNE 13, 1913.
1,200,109.
Patented Oct. 3, 1916.
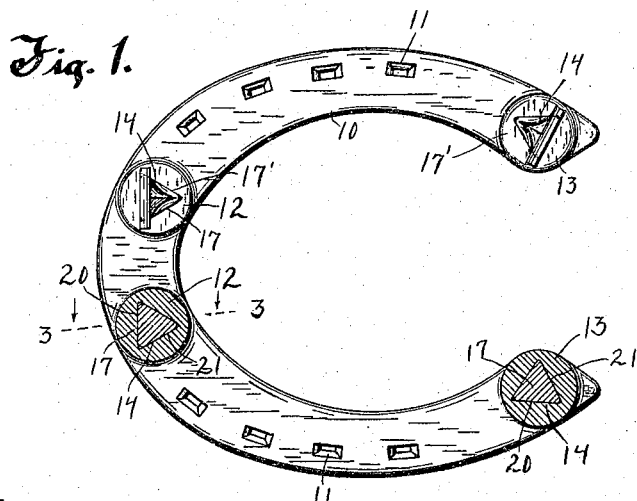
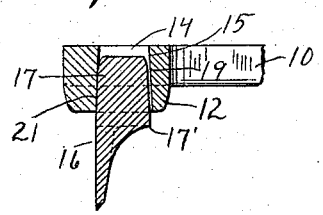
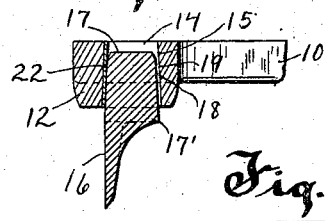
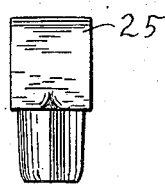
WITNESSES.
Clara V Muehlbach
C. F. Miller
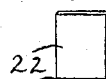
INVENTOR.
Arthur Stanley Holmes
By Morsell & Caldwell
ATTORNEYS.

UNITED STATES PATENT OFFICE.

ARTHUR STANLEY HOLMES, OF OSHKOSH, WISCONSIN.

HORSESHOE.

1,200,109.  Specification of Letters Patent.  Patented Oct. 3, 1916.

Application filed June 13, 1913. Serial No. 773,397.

*To all whom it may concern:*

Be it known that I, ARTHUR STANLEY HOLMES, a citizen of the United States, and resident of Oshkosh, in the county of Winnebago and State of Wisconsin, have invented new and useful Improvements in Horseshoes, of which the following is a description, reference being had to the accompanying drawings, which are a part of this specification.

This invention relates to improvements in horse shoes, having calks of the removable type.

In providing horse shoes with removable calks it is the common practice to form the calks with round tapered shank portions which are driven into correspondingly shaped openings formed in the shoes. The calks when first applied to new shoes are driven therein to points where their shanks will project a slight distance below the shoe. In use the calks are driven in deeper and deeper by the animal striking his foot against the hard pavement so that by the time the shanks of the calks are driven into the shoes their full length or depth the said calks are about worn out and have to be replaced and if not replaced, the continued use will cause the calks to work loose and drop out as they cannot further work up wedgingly into the shoe. In securing the old calks or in replacing new calks into the worn and slightly enlarged shoe openings, it was found to be impractical to use tapered bushings around the shanks of round shanked drive calks, and the plan was evolved of providing calks with tapered shanks of different diameters so that the next largest size could be used in replacing a worn calk. In fitting new calks to the shoe openings the openings were formed to proper gage by a drifting tool to provide for the proper projection of the shanks.

In using the calks mentioned the dealers and horseshoers were compelled to keep a stock of the calks with different sized shanks and ofttimes the demand for one size was greater than for the other sizes and consequently a great deal of confusion was caused. In use the round calks would frequently turn in the shoe and drop out and lead to the injury of the animal wearing the same.

In some of the foreign countries calks are used with tapered rectangular or oblong shanks and pairs of shims have been used or the shanks have been wound with cloth when the holes in the shoes became worn and replaced to form a tight fit.

It is one of the objects of the present invention to overcome the before mentioned objectionable features and provide a horseshoe having removable calks which will be firmly held in the shoe at all times and which may be easily replaced when worn.

A further object of the present invention is to provide a horseshoe having removable calks which may be easily replaced when the holes in the shoes become worn by new calks of the same size, and each new calk be held firmly in position by means of a single shim.

A further object of the invention is to provide a horseshoe having removable calks with tapered shanks which are triangular in cross section and fit into correspondingly shaped openings in the shoe.

A further object of the invention is to provide a horseshoe having removable tapered triangular shanked calks which are of simple construction, strong and durable and are well adapted for the purpose desired.

With the above and other objects in view, the invention consists of the improved horseshoe and its parts and combinations as set forth in the claim, and all equivalents thereof.

In the accompanying drawing in which the same reference characters indicate the same parts in all of the views: Figure 1 is a bottom view of the improved horseshoe, portions being in section; Fig. 2 is a similar view of one of the heel portions of the shoe; Fig. 3 is a transverse sectional view taken on line 3—3 of Fig. 1; Fig. 4 is a similar view thereof showing a replaced calk held in position by a shim; Fig. 5 is a perspective view of one of the shims; Fig. 6 is a side view of a drift tool used for forming the shoe openings to gage; Fig. 7 is a top view thereof; Fig. 8 is a side view of a modified form of calk; and Fig. 9 is a top view thereof.

Referring to the drawing the numeral 10 indicates the improved shoe which is provided with the ordinary nail openings 11 and reinforcing toe and heel bosses 12 and 13 respectively. The bosses 12 and 13 are provided with approximately triangular shaped tapered openings 14 which extend through the body of the shoe with the openings decreasing in size toward the top of the shoe. The corners 15 of the openings are somewhat rounded. Removable calks 16 having tapered shanks 17 which are triangular in cross section are adapted to be driven into the triangular openings to a position within a short distance of the base 17' of the calk shanks to provide for the further wedging movement therein while in use.

The corners 18 of the shanks are rounded to a greater degree than the corners 15 to provide corner spaces 19 between the shank corners and the corners of the openings to insure the engagement of the flat shank faces 20 with the flat walls 21 of the openings. Furthermore, rounding the corner of the shank, which shortens the flat faces and terminates the corners short of the corners of the calk opening, and forms the spaces 19 at each corner, allows of a lateral wedging action of each shank in its opening when a side pressure in any direction is imposed upon the calk. In other words, a side pressure from any direction upon the calk will impose a like pressure on the shank and owing to the triangular shape of the shank, it will always tend to drive one of the corners into the corner of the opening, and as any side pressure given to the triangular form will be opposed by two of the converging side faces, it will cause a slight wedge action in that direction. This lateral wedging action together with the vertical wedging action, forms a secure fastening means for the calk and prevents it from being accidentally displaced.

When the calks have in use been driven into the shoes to the base of the shanks and have become worn and loose they may be easily tightened by removing same and inserting thin shims 22 between the shanks and shoe opening walls on one side of the shanks and then driving the calks into the shoe the proper distance, or new calks may be inserted in the same manner with the shims as the shims will compensate for the increased size of the openings due to wear. To provide for accurately gaging the shank openings of the shoe a drift tool 23 is driven into the openings to the shoulder 24 and the openings will then be of the proper size to receive the shanks in proper spaced relation to their base portions. In the modified form of calk shown in Figs. 8 and 9 the contacting edge 25 is more blunt than the form shown in the other figures.

It is to be understood that other forms of calk ends may be used without departing from the spirit and scope of the invention.

From the foregoing description it will be seen that the triangular form of calk shank prevents turning of the calk and when used in connection with a shim may be moved laterally into wedging engagement with the other two walls of the opening and be securely held in position.

What I claim as my invention is:

A horseshoe, comprising a shoe portion having a plurality of tapered calk openings of triangular cross-section, and a plurality of calks each having an upwardly tapered shank of triangular cross-section adapted to be wedged into its respective calk opening by upward pressure, and each shank having its corners terminating short of the corners of the calk opening to provide spaces adjacent said corners to allow a lateral wedging of the shank in its respective opening when side pressure is imposed thereon.

In testimony whereof, I affix my signature, in presence of two witnesses.

ARTHUR STANLEY HOLMES.

Witnesses:
WALLACE H. HINQUIST,
A. N. MACNABB.

Copies of this patent may be obtained for five cents each, by addressing the "Commissioner of Patents, Washington, D. C."